United States Patent [19]

Rumpf et al.

[11] Patent Number: 4,907,757

[45] Date of Patent: Mar. 13, 1990

[54] COMFORT MECHANISM WITH SLACK LIMIT

[75] Inventors: Robert J. Rumpf, Grosse Pointe; Lawrence M. Refior, Attica; Lenard D. Klebba, Romeo; Steven G. Corrion, Utica, all of Mich.

[73] Assignee: TRW Vehicle Safety Systems Inc., Lyndhurst, Ohio

[21] Appl. No.: 366,851

[22] Filed: Jun. 14, 1989

[51] Int. Cl.⁴ .............................................. B60R 22/34
[52] U.S. Cl. ................................. 242/107.6; 280/807
[58] Field of Search ............ 242/107.6, 107.7, 107.12; 280/807, 806, 808; 297/475–478

[56] References Cited

U.S. PATENT DOCUMENTS

| | | | |
|---|---|---|---|
| 4,467,982 | 8/1984 | Tajima et al. | 242/107.6 |
| 4,534,520 | 8/1985 | Yanagihara | 242/107.6 X |
| 4,811,913 | 3/1989 | Fernandez | 242/107.6 |
| 4,840,324 | 6/1989 | Higbee et al. | 242/107.6 |

Primary Examiner—John M. Jillions
Attorney, Agent, or Firm—Tarolli, Sundheim & Covell

[57] ABSTRACT

In a seat belt retractor having a comfort mechanism, a spindle having belt webbing wound thereon is supported for rotation in belt retraction and belt withdrawal directions. A wind-up spring biases the spindle to rotate in the belt retraction direction. A rotatable member is rotatable relative to the spindle. Actuating means has a first condition in which the rotatable member is free to rotate and a second condition in which rotation of the rotatable member is blocked. An auxiliary wind-up spring has one end connected to the rotatable member and another end connected to the spindle. The auxiliary wind-up spring is (i) wound about a portion of the spindle to a taut condition when the actuating means is in its first condition to cause the spindle and the rotatable member to rotate together, (ii) unwound upon rotation of the spindle in the belt withdrawal direction when the actuating means is in its second condition to enable the spindle to rotate relative to the rotatable member, and (iii) rewound about the portion of the spindle to the taut condition to limit rotation of the spindle in the belt retraction direction relative to the rotatable member after withdrawal of the belt webbing from the spindle when the actuating means is in its second condition. A predetermined amount of slack is set in the belt when the comfort mechanism is engaged.

17 Claims, 8 Drawing Sheets

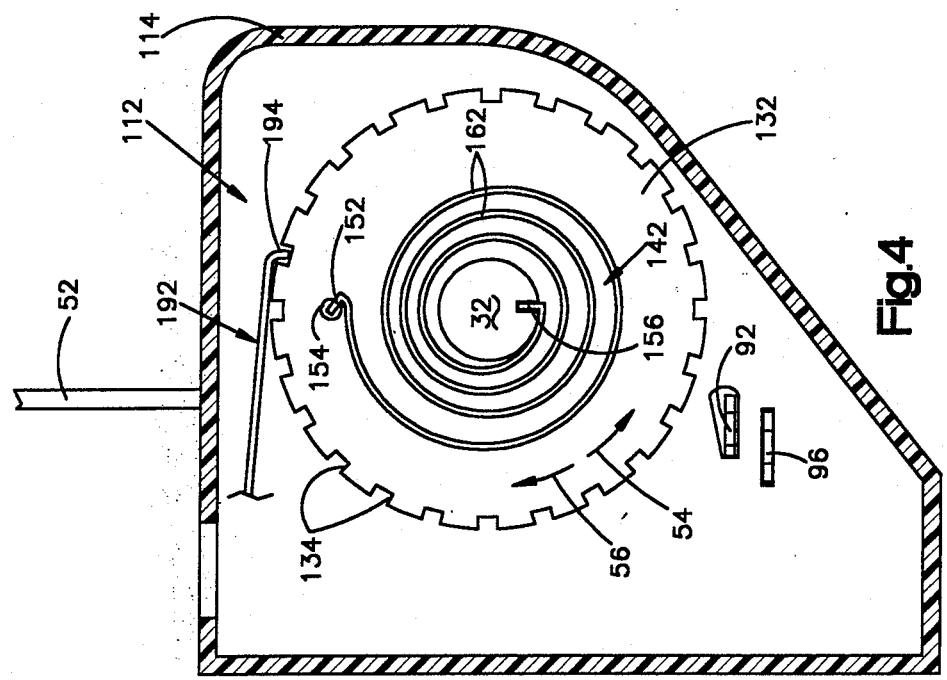
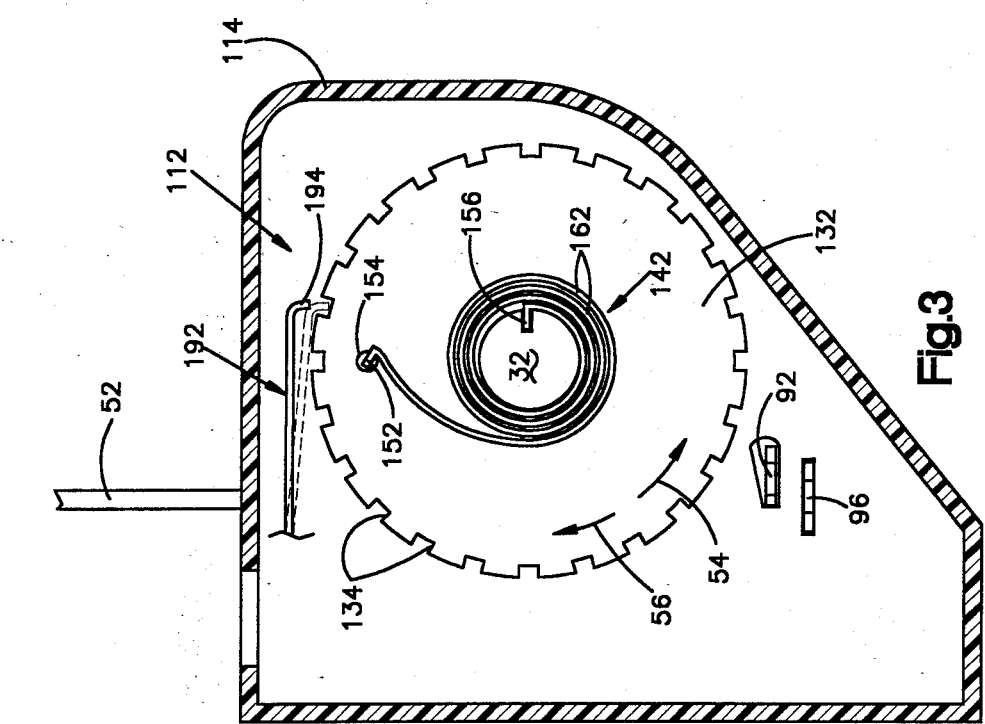

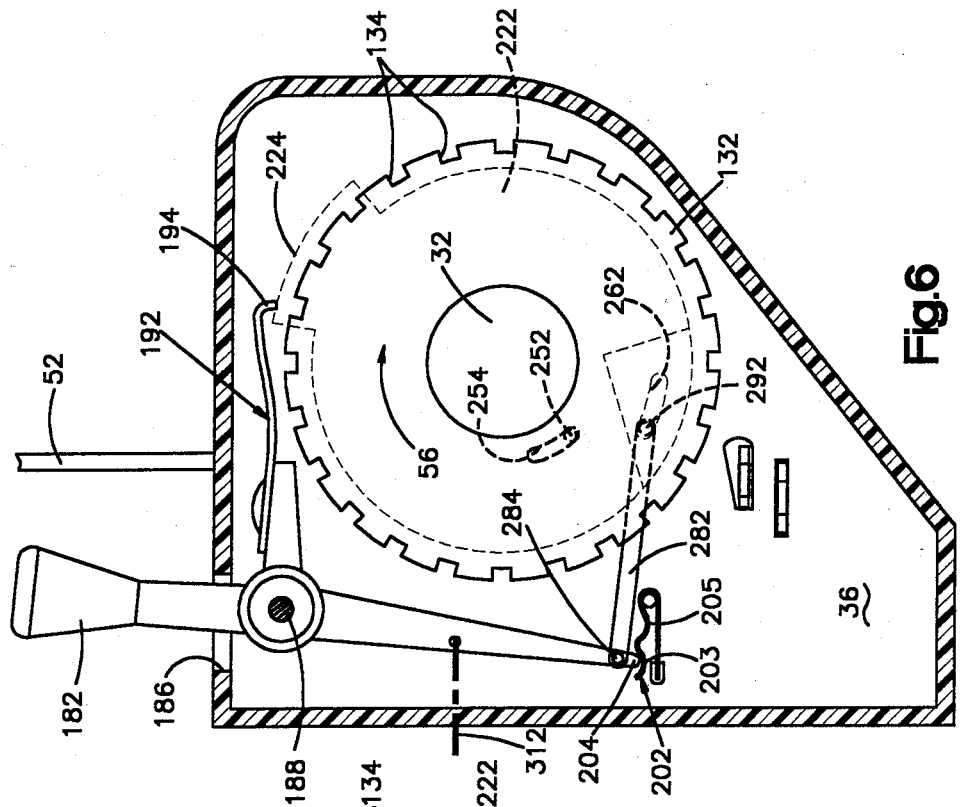
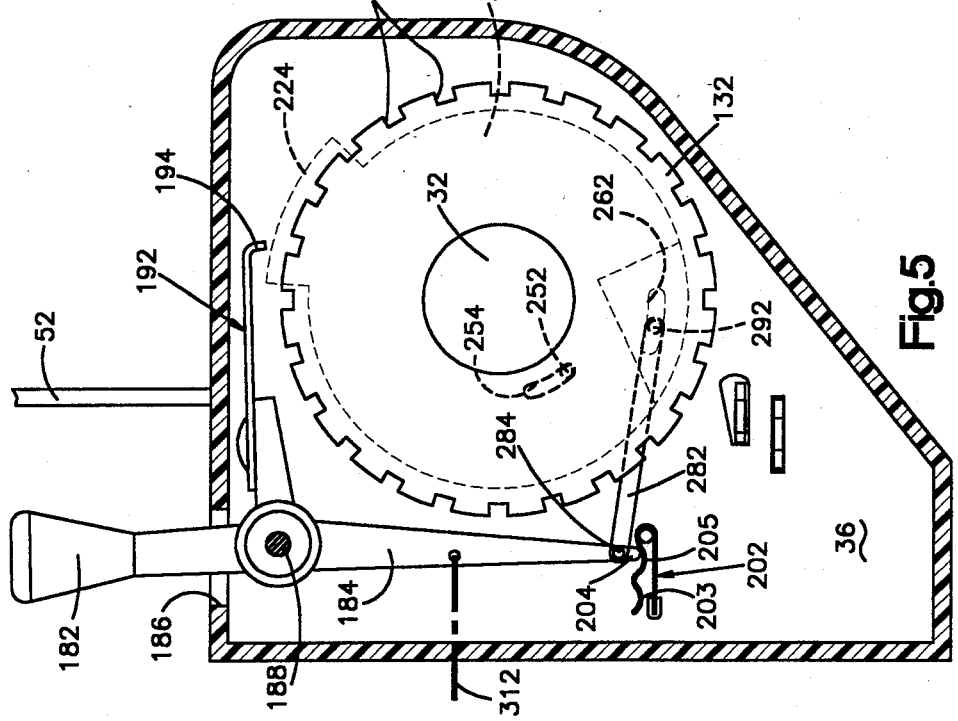

COMFORT MECHANISM WITH SLACK LIMIT

BACKGROUND OF THE INVENTION

1. Technical Field

The present invention relates to a seat belt retractor and, in particular, the present invention relates to a seat belt retractor having a comfort mechanism.

2. Description of the Prior Art

Comfort mechanisms for seat belt retractors are known. U.S. Pat. No. 4,467,982 discloses a comfort mechanism which is actuated after the belt wearer establishes a desired amount of slack in the belt webbing. The comfort mechanism, when actuated, blocks rotation of a seat belt retractor take-up spool in a belt retraction direction to maintain the slack in the belt webbing that was established. Thus, the biasing force exerted by a wind-up spring tending to rotate the take-up spool in a belt retraction direction is not transferred through the seat belt webbing to the belt wearer.

U.S. patent application Ser. No. 138,838, filed Dec. 28, 1987 now U.S. Pat. No. 4,840,324 and assigned to the assignee of the present invention, discloses a comfort mechanism which establishes slack in belt webbing during actuation of the comfort mechanism. The comfort mechanism includes a drum having a plurality of ratchet teeth formed on the drum. The drum is connectable with a spindle of the retractor. A member is moved to engage one of the ratchet teeth on the drum and rotate the drum a predetermined amount. Rotation of the drum causes the spindle to rotate in a belt withdrawal direction to establish a predetermined amount of slack in the belt webbing. The member then blocks both the drum and the spindle from rotating in a belt retraction direction to maintain the slack in the belt webbing that was established.

SUMMARY OF THE INVENTION

The present invention is directed to a seat belt retractor including a comfort mechanism. The seat belt retractor includes a spindle supported for rotation in belt retraction and belt withdrawal directions. Seat belt webbing is wound onto the spindle. A wind-up spring biases the spindle to rotate in the belt retraction direction. A disk member is supported for rotation by a portion of the spindle. Actuatable means has a first condition in which the disk member is free to rotate and a second condition in which rotation of the disk member by the wind-up spring is blocked. An elongate flexible member has an end portion connected to the disk member and another end portion connected to the spindle. The elongate flexible member winds about a portion of the spindle to a taut condition when the actuatable means is in its first condition to cause the spindle and the disk member to rotate together. The elongate flexible member unwinds from the taut condition upon rotation of the spindle in the belt withdrawal direction when the actuatable means is in its second condition to enable the spindle to rotate relative to the disk member. When the actuatable means is in its second condition and after webbing has been withdrawn from the spindle, the elongate flexible member rewinds about the portion of the spindle to the taut condition during rotation of the spindle in the belt retraction direction to limit rotation of the spindle in the belt retraction direction relative to the disk member.

The elongate flexible member is a metal coil spring having a spring rate lower than the spring rate of the wind-up spring. The metal coil spring biases the disk member to an initial position relative to the spindle and causes the disk member to rotate with the spindle when the actuatable means is in its first condition.

In a first embodiment of the invention, the actuatable means includes a lever supported for pivotal movement and receivable in one of a plurality of recesses in the disk member to block rotation of the disk member in either direction. The seat belt retractor further includes means for preventing the lever from engaging the disk member, until the spindle rotates in the belt withdrawal direction a predetermined amount to allow a predetermined amount of slack to be established in the belt webbing. The preventing means includes a rotatable cam. The cam has a surface rotatable between a first position in which the lever is prevented from engaging the disk member and a second position in which the lever is permitted to engage the disk member. The cam rotates between its first and second positions in response to rotation of the disk member and the spindle.

In a second embodiment of the invention, the actuatable means includes an electric motor drive which is energized when the vehicle occupant actuates a switch. The electric motor rotates a sector gear which is coaxial with the rotatable disk. A pawl is pivotally mounted on the sector gear. As the sector gear turns, the pawl is cammed into one of the recesses in the disk and blocks the wind-up spring from rotating the disk in the belt retraction direction. The electric motor remains energized, and the sector gear continues to turn. The pawl rotates the disk in the belt withdrawal direction by a predetermined amount, then the motor then shuts off. As the disk rotates the predetermined amount, the retractor spindle also rotates and a predetermined amount of belt webbing is paid out to set a predetermined amount of slack in the belt.

In a third embodiment of the invention, an electric motor drives a worm gear. The worm gear drives an idler gear. The idler gear drives a rack gear linearly. The rack gear engages the rotatable disk which in this embodiment has spur gear teeth formed thereon. As the rack gear moves linearly, the disk is rotated in the belt withdrawal direction by a predetermined amount, to rotate the spindle and pay out a predetermined amount of belt webbing to establish slack in the belt. When the motor is de-energized, the disk is blocked from rotation by the wind-up spring due to a locking relationship between the teeth of the worm gear and the teeth of the idler gear.

BRIEF DESCRIPTION OF THE DRAWINGS

Further features of the present invention will become apparent to those skilled in the art to which the present invention relates from reading the following specification with reference to the accompanying drawings, in which:

FIG. 3 is a view taken approximately along the line 3—3 of FIG. 1 illustrating certain parts;

FIG. 4 is a view similar to FIG. 3 with parts in different positions;

FIG. 5 is a view of the retractor of FIG. 1, also taken approximately along line 3—3 in FIG. 1 illustrating parts not shown in FIG. 3;

FIGS. 6 and 7 are views similar to FIG. 5 with parts in different positions;

DESCRIPTION OF A PREFERRED EMBODIMENT

Figure 1:
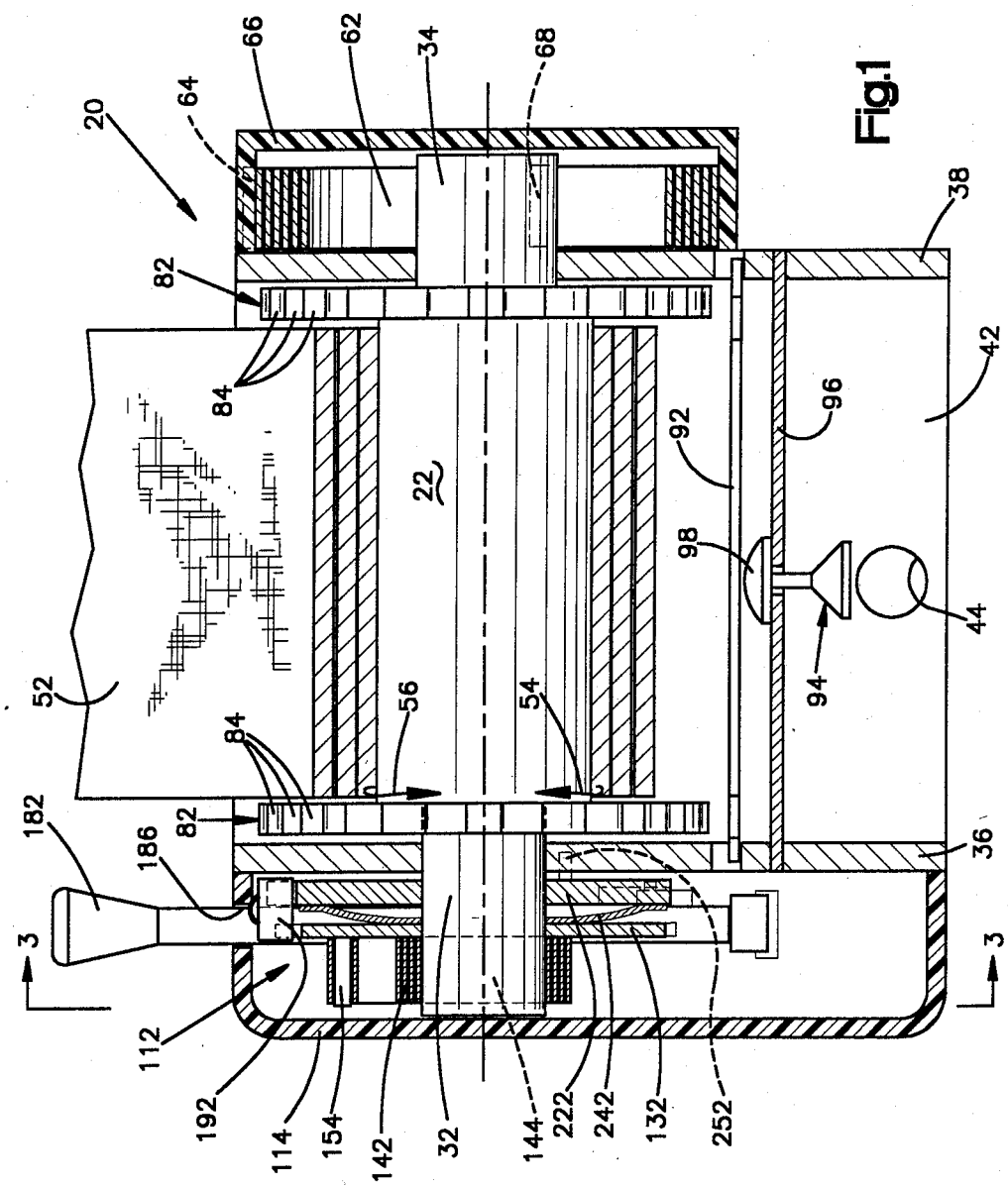
FIG. 1 is a view of a seat belt retractor having a comfort mechanism embodying the present invention.

FIG. 1 illustrates a seat belt retractor 20 for use in a vehicle. The seat belt retractor 20 includes a spindle 22. A pair of stub shafts 32, 34 are connected to and extend from axially opposite ends of the spindle 22. Each of the stub shafts 32, 34 is received in an opening in a respective side 36, 38 of a frame 42 to support the spindle 22 for rotation. An opening 44 in the frame 42 receives a fastener (not shown) to connect the retractor 20 to the vehicle.

Figure 2:
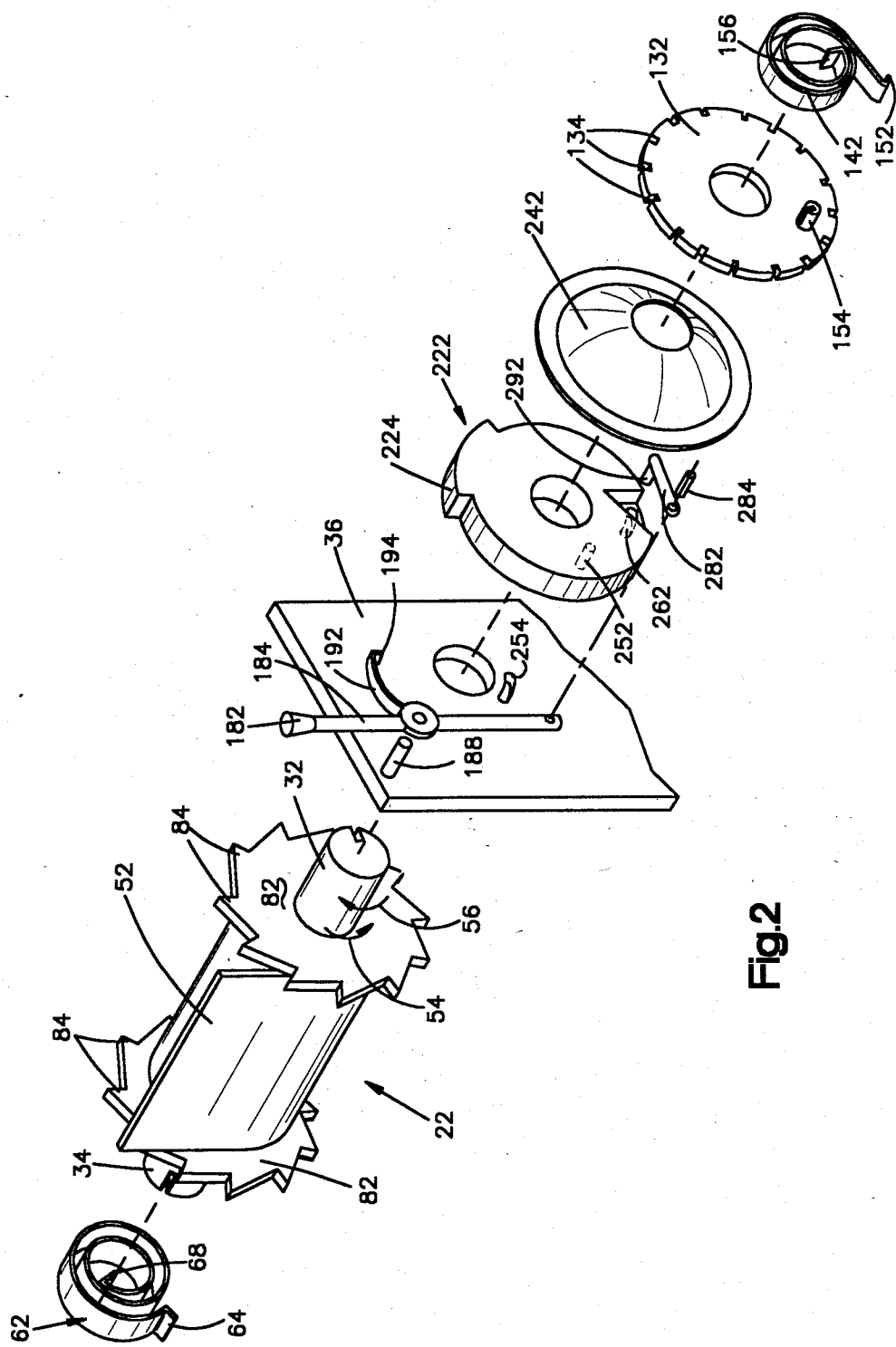
FIG. 2 is an exploded perspective view of the comfort mechanism illustrated in FIG. 1.

Seat belt webbing 52 (FIGS. 1 and 2) is connected at one end to the spindle 22 and is wound onto the spindle for storage. The belt webbing 52 is extendable about an occupant of the vehicle for restraining the occupant. The spindle 22 is rotatable in a belt retraction direction 54 (FIG. 2) and a belt withdrawal direction 56. A wind-up spring 62 has one end portion 64 connected to a spring cover 66 which is attached to the frame side 38. Another end portion 68 of the wind-up spring 62 is connected to the stub shaft 34. The wind-up spring 62 biases the spindle 22 to rotate in the belt retraction direction 54 which tends to pull the belt webbing 52 against the vehicle occupant.

A pair of ratchet wheels 82 (FIGS. 1 and 2) are connected to axially opposite end portions of the spindle 22 adjacent each frame side 36, 38. A plurality of ratchet teeth 84 extend radially outwardly from each of the ratchet wheels 82 and are equally spaced about the outer circumference of the ratchet wheel. A pawl 92 extends between and is supported for pivotal movement by the sides 36, 38 of the frame 42. A pendulum-type inertia member 94 is supported for pivotal movement by a beam 96 extending between the sides 36, 38 of the frame 42 adjacent the pawl 92. The inertia member 74 pivots relative to the beam 96 in response to acceleration or deceleration of the vehicle at a rate above a predetermined rate, as is known.

Upon pivotal movement of the inertia member 94, an upper portion 98 of the inertia member engages the pawl 92 and causes the pawl to pivot toward the ratchet wheels 82. The pawl 92 engages a ratchet tooth 84 on each of the ratchet wheels 82 to block the spindle 22 from rotating in the belt withdrawal direction 56. While a vehicle sensitive type locking mechanism is described, it should be apparent that any known type of locking mechanism may be used to block rotation of the spindle 22 in the belt withdrawal direction 56 during an emergency.

The retractor 20 also includes an actuatable comfort mechanism 112 in accordance with a first embodiment of the invention. The comfort mechanism 112 is located within a housing 114 (FIG. 1) connected to the frame side 36 of the retractor 20. When actuated, the comfort mechanism 112 blocks rotation of the spindle 22 in the belt retraction direction 54 so the belt webbing 52 is not pulled against the occupant by the biasing force exerted by the wind-up spring 62.

The comfort mechanism 112 includes a circular disk 132 (FIGS. 2 and 3) supported on the stub shaft 32. The circular disk 132 is rotatable relative to the spindle 22 about the stub shaft 32. A plurality of recesses 134 are spaced equally about the outer circumference of the circular disk 132.

An auxiliary coil spring 142 (FIGS. 2 and 3) connects the disk 132 with the spindle 22 through the stub shaft 32. The auxiliary spring 142 has one end portion 152 fixed to a projection 154 extending axially from the disk 132. Another end portion 156 of the auxiliary spring 142 is fixed to the stub shaft 32. The auxiliary spring 142 is wound around a portion 144 (FIG. 1) of the stub shaft 32 and in a direction opposite to that of the wind-up spring 62. The auxiliary spring 142 has a spring rate lower than the spring rate of the wind-up spring 62. When the disk 132 is free to rotate, the auxiliary spring 142 is wound to a taut condition around the stub shaft 32 in which adjacent coils 162 engage (shown in FIG. 3 slightly spaced for clarity). When the auxiliary spring 142 is in its taut condition and the disk 132 is free to rotate, the auxiliary spring biases the disk to an initial position relative to the stub shaft 32 to rotate the disk with the spindle 22 in either direction 54, 56.

When the disk 132 is fixed against rotation and the auxiliary spring 142 is in its taut condition around the stub shaft 32, the auxiliary spring prevents the stub shaft and spindle 22 from rotating in a belt retraction direction 54 under the influence of the wind-up spring 62. Thus, the belt webbing 52 is not pulled against the occupant which could cause discomfort.

When the disk 132 is fixed against rotation and some of the belt webbing 52 is withdrawn from the retractor 20, the auxiliary spring 142 relaxes from its taut or coil bound condition. The adjacent coils 162 disengage one another and the auxiliary spring 142 increases in diameter to function as "memory" for the comfort mechanism 112. Thereafter, when the force causing the belt webbing 52 to be withdrawn from the retractor 20 is removed, the wind-up spring 62 rotates the spindle 22 in the belt retraction direction 54. The auxiliary spring 142 then winds onto the portion 144 of the stub shaft 32. When the auxiliary spring 142 again reaches its taut condition, the auxiliary spring prevents rotation of the spindle 22 in the belt retraction direction 54. Rotation of the spindle 22 is stopped at approximately the same rotational position as when the comfort mechanism 112 was actuated so the same amount of slack exists in the belt webbing 52. This constitutes the "memory" of the comfort mechanism 112. The amount of memory is limited only by the diameter and number of coils 162 of the auxiliary spring 142 relative to the number of rotations that the spindle 22 can rotate in the belt withdrawal direction 56 before the comfort mechanism 112 is deactuated.

Figure 7:
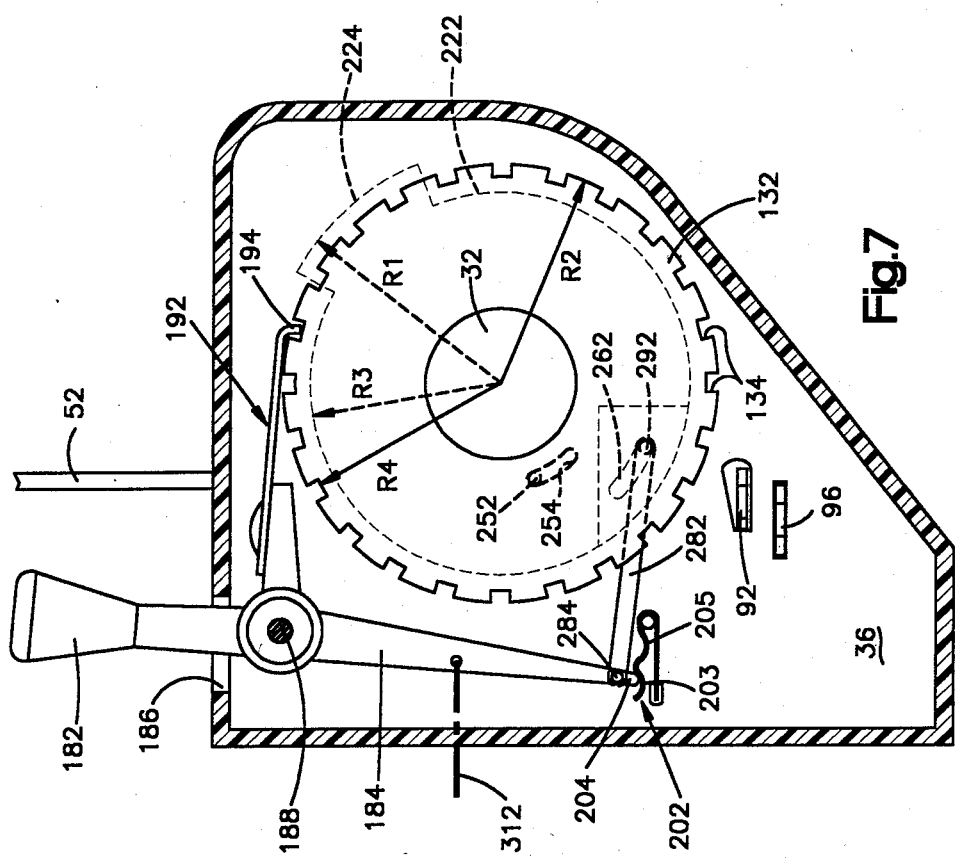

The comfort mechanism 112 includes a handle 182 attached to one end of a lever 184 (FIGS. 1, 2 and 5-7). The handle 182 extends from an opening 186 in the housing 114. The lever 184 is supported for pivotal movement by a pin 188 (FIGS. 2 and 5) fixed to and extending axially from the frame side 36. A resiliently deflectable arm 192 is fixed to the lever 184 (FIGS. 5-7). The arm 192 has an end portion 194 which is receivable in one of the recesses 134 in the disk 132 to block rotation of the disk in either direction. A spring 202 has a pair of U-shaped detent portions 203 and 205 for receiving the end 204 of the lever 184 which is opposite the handle 182. The detent portion 203 of the spring 202 maintains the lever 184 in the position shown in FIG. 6 and the detent portion 205 maintains the lever 184 in the position shown in FIG. 5.

The comfort mechanism 112 also includes a cam 222 (FIGS. 5-7) supported for rotation on the stub shaft 32. A cam lobe 224 extends radially outward from the cam 222. The cam lobe 224 has a radius R1 (FIG. 7) greater than the largest radius R2 of the disk 132. The cam 222 has a radius R3 less than the radius R4 to the bottom of each recess 134. A friction spring 242 (FIGS. 1 and 2) drives the cam 222 in response to rotation of the disk 132. The cam 222 has a projection 252 (FIGS. 2 and 5-7) extending axially into an arcuate slot 254 in the frame side 36. The arcuate slot 254 limits the amount of rotational movement of the cam 222.

Another arcuate slot 262 is located in the cam 222. The arcuate length of the slot 262 in the cam 222 is greater than the arcuate length of the slot 254 located in the frame side 36. A cam return link 282 (FIGS. 2 and 5-7) is pivotally supported at one end by a pin 284 extending through the end 204 of the lever 184. Another pin 292 extends axially relative to the cam 222 from the other end of the link 282 and is received in the arcuate slot 262 in the cam 222.

To actuate the comfort mechanism once the belt webbing is extended around the occupant, the occupant moves the lever 184 to the position illustrated in FIG. 6 so that the end 194 of the member 192 engages the cam lobe 224 on the cam 222. The occupant then withdraws the belt webbing 52 from the retractor 20, causing the spindle 22, the disk 132 and the cam 222 to rotate in the belt withdrawal direction 56. When the spindle 22 rotates a predetermined amount in the belt withdrawal direction 56, setting a predetermined amount of slack in the belt webbing 52, the cam 222 rotates in the clockwise direction from the position illustrated in FIG. 6 to the position illustrated in FIG. 7 in which the cam projection 252 abuts the end of the slot 254 and the cam 222 stops rotating. The end 194 of the member 192 moves off the cam lobe 224 to engage the disk 132 and enters one of the recesses 134 to block rotation of the disk 132. Since the disk 132 is fixed against rotation and the auxiliary spring 142 is wound about the stub shaft 32 in its taut condition, rotation of the spindle 22 in the belt retraction direction 54 by the wind-up spring 62 is blocked. In this position, the pin 292 on the clutch return link 282 is at one end of the cam slot 262.

The comfort mechanism 112 may be deactuated in several ways. One way to deactuate the comfort mechanism 112 is by returning the handle 182 on the lever 184 to the position illustrated in FIG. 5, thus lifting the end 194 of the member 192 out of engagement with the disk 132. Simultaneously, the cam return link 282 moves to the right, as viewed in FIG. 7. The pin 292, pushing against the end of the slot 262, rotates the cam 222 counterclockwise until the pin 252 engages the end of the slot 254. The cam 222 is then in the position shown in FIG. 5 in which the cam lobe 224 is disposed beneath the end 194 of the member 192. The disk 132 is free to rotate, enabling the wind-up spring 62 to rotate the spindle 22 in the belt retraction direction 54.

The comfort mechanism 112 may also be deactuated with a pull-off which moves the lever 184 from the position illustrated in FIG. 7 to the position illustrated in FIG. 5. Such a pull-off includes a cable 312 (illustrated schematically in FIG. 5) which is connected between the lever 184 and a vehicle door (not shown). When the vehicle door is opened, the cable moves and pulls the lever 184 to the position shown in FIG. 5, deactuating the comfort mechanism 112.

Figure 8:
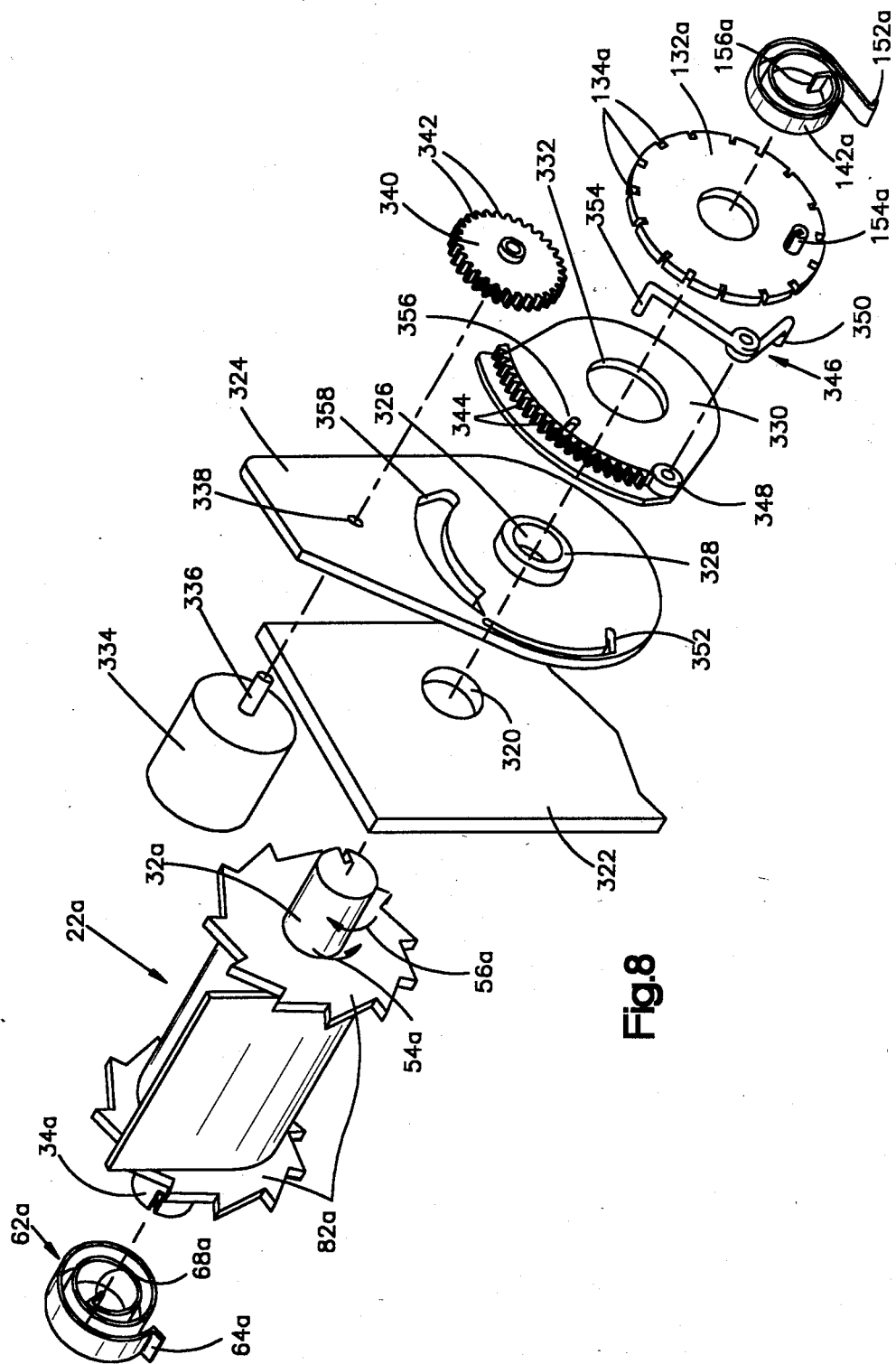
FIG. 8 is an exploded perspective view of a seat belt retractor having a comfort mechanism in accordance with a second embodiment of the invention.
Figure 10:
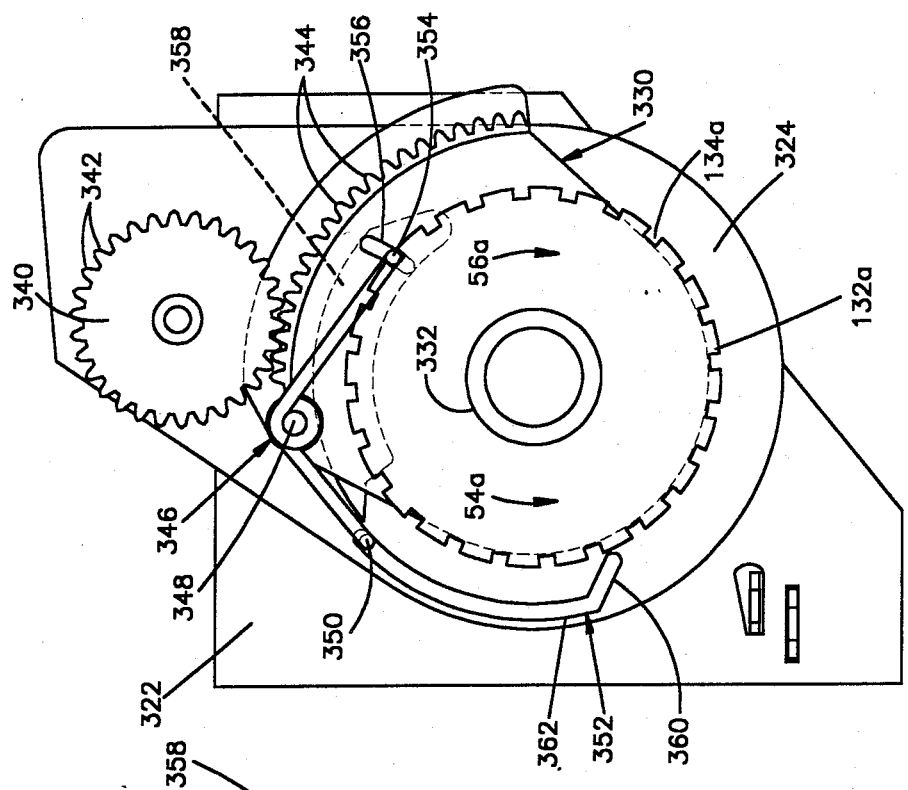
FIG. 10 is a view similar to FIG. 9 with parts in a second condition.
Figure 9:
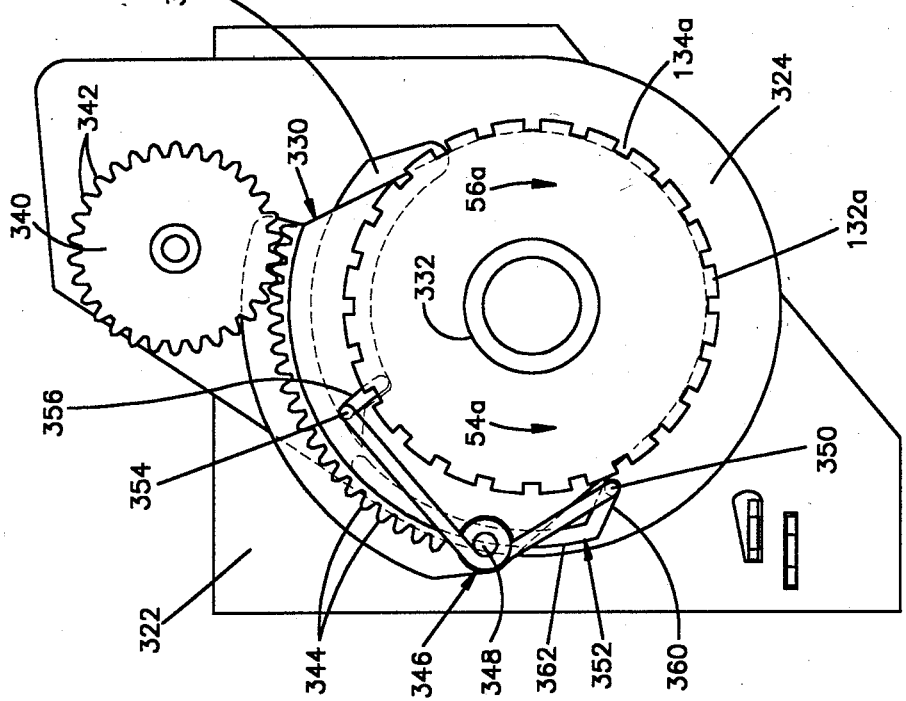
FIG. 9 is a view of the comfort mechanism of FIG. 8 with parts in a first condition.

A comfort mechanism in accordance with a second embodiment of the invention is illustrated in FIGS. 8, 9 and 10, wherein parts which are identical to those in the first embodiment are given the same reference numeral with the suffix "a" added thereto to distinguish them from those of the first embodiment. The retractor of FIGS. 8, 9 and 10 includes a spindle 22a which is rotatable in a belt retraction direction 54a and a belt withdrawal direction 56a. A pair of stub shafts 32a and 34a extend from axially opposite ends of the spindle 22a. A wind-up spring 62a has one end 64a for connection to a fixed location on the retractor frame or housing. The other end 68a of the wind-up spring 62a is connected to the stub shaft 34a. The wind-up spring 62a biases the spindle 22a to rotate in the belt retraction direction 54a. The spindle 22a also includes a pair of ratchet wheels 82a which are engageable by a pawl locking mechanism (not shown) in a manner similar to that described with reference to the first embodiment of the invention.

The comfort mechanism when actuated blocks rotation of the spindle 22a by the wind-up spring 62a in the belt retraction direction 54a. The comfort mechanism includes a circular disk 132a supported on the stub shaft 32a for rotation relative to the spindle 22a. A plurality of recesses 134a are spaced equally about the outer circumference of the disk 132a. An auxiliary coil spring 142a connects the disk 132a with the spindle 22a through the stub shaft 32a. One end portion 152a of the auxiliary spring 142a is fixed to a projection 154a extending axially from the disk 132a. The other end portion 156a of the auxiliary spring 142a is fixed to a slot in the stub shaft 32a. When the disk 132a is blocked from rotation, the spindle 22a may rotate a certain amount against the bias of the auxiliary spring 142a, in the belt withdrawal direction, to allow a vehicle occupant to move forward in the seat. When the vehicle occupant moves back to his initial position in the seat, the auxiliary wind-up spring 152a will return the spindle 22a to its original position, retracting the belt to the previously set position.

The spindle stub portion 32a extends through an opening 320 in a frame side portion 322 and through an opening 326 in a plate 324 which is fixed to the frame side portion 322. A boss 328 surrounds the opening 326. A sector gear 330 is fitted against the plate 324. An opening 332 in the sector gear 330 fits around the boss 328 on the plate 324. The sector gear 330 is rotatable relative to the plate 324.

A DC reversible electric motor 334, powered by the vehicle electrical system, is mounted on the plate 324. An output shaft 336 of the electric motor 334 extends through an opening 338 in the plate 324. The output shaft 336 drives a spur gear 340. The spur gear 340 has a plurality of teeth 342 which meshingly engage teeth 344 on the sector gear 330. An L-shaped pawl 346 is pivotally mounted on the sector gear 330 at a pawl mount 348. A first end portion 350 of the pawl 346 is received in a cam slot 352 in the plate 324. A second end portion 354 of the pawl 346 extends through a guide slot 356 in the sector gear 330 and into a slot 358 in the plate 324.

To actuate the comfort mechanism shown in FIGS. 8–10, the vehicle occupant actuates a switch (not shown) which may be mounted, for example, on the dashboard of the vehicle. The switch energizes the electric motor 334. The motor output shaft 336 rotates the spur gear 340 in a counterclockwise direction as viewed in FIGS. 9 and 10. As the spur gear 340 rotates, the teeth 342 on the spur gear engage the teeth 344 on the sector gear 330, and the sector gear 330 rotates in the clockwise direction as viewed in FIGS. 9 and 10. As the sector gear 330 rotates, the pawl mount 348 on the sector gear 330 moves arcuately, moving the pawl 346 as a whole arcuately. As the pawl 346 moves arcuately, the first end 350 of the pawl 346 is cammed outwardly by a first portion 360 of the cam slot 352. The pawl 346 pivots about the pawl mount 348 and the second end 354 of the pawl 346 moves inwardly, guided by the slot 356 in the sector gear 330, to engage one of the recesses 134a in the disk member 132a. When the pawl 346 is in engagement with the disk member 132a, the wind-up spring 62a is not strong enough to rotate the disk member 132a against the friction, gearing and resistance of the comfort mechanism. The disk member 132a is thereby blocked from rotation by the wind-up spring 62a in the belt retraction direction 54a. The "memory" feature of the comfort mechanism is also operative as described above with reference to the first embodiment of the invention.

The electric motor 334 remains energized and continues to turn the spur gear 342. The sector gear 330 continues to rotate in the clockwise direction as viewed in FIGS. 9 and 10, drawing the pawl 346 arcuately along with it. The first end 350 of the pawl 346 moves along a second segment 362 of the cam slot 352 which extends arcuately along the plate 324. The second end 354 of the pawl 346 rotates the disk member 132a in the clockwise direction as viewed in FIGS. 9 and 10, i.e., in the belt withdrawal direction 56a The disk member 132a continues to rotate predetermined amount until the pawl second end 354 reaches an end 364 of the cam slot 352, at which time the motor 334 is de-energized As the disk 132a rotates, the spindle 22a also rotates in the belt withdrawal direction 56a to thus pay out a predetermined amount of belt webbing and provide a predetermined amount of slack in the belt webbing extending about the vehicle occupant.

The comfort mechanism shown in FIGS. 8–10 may be deactuated by actuating a switch, by disengaging a seat belt tongue from a buckle assembly or by opening a vehicle door or shutting off the vehicle. When the comfort mechanism is deactuated, the electric motor 334 is energized in reverse and drives the sector gear 330 to rotate counterclockwise, as viewed in FIGS. 9 and 10. The pawl 346 is driven in the belt retraction direction 54a and rotates the disk member 132a to its original position in which the pawl 346 does not engage the disk member 132a. The disk member 132a is free to rotate, and the comfort mechanism is disengaged.

Figure 12:
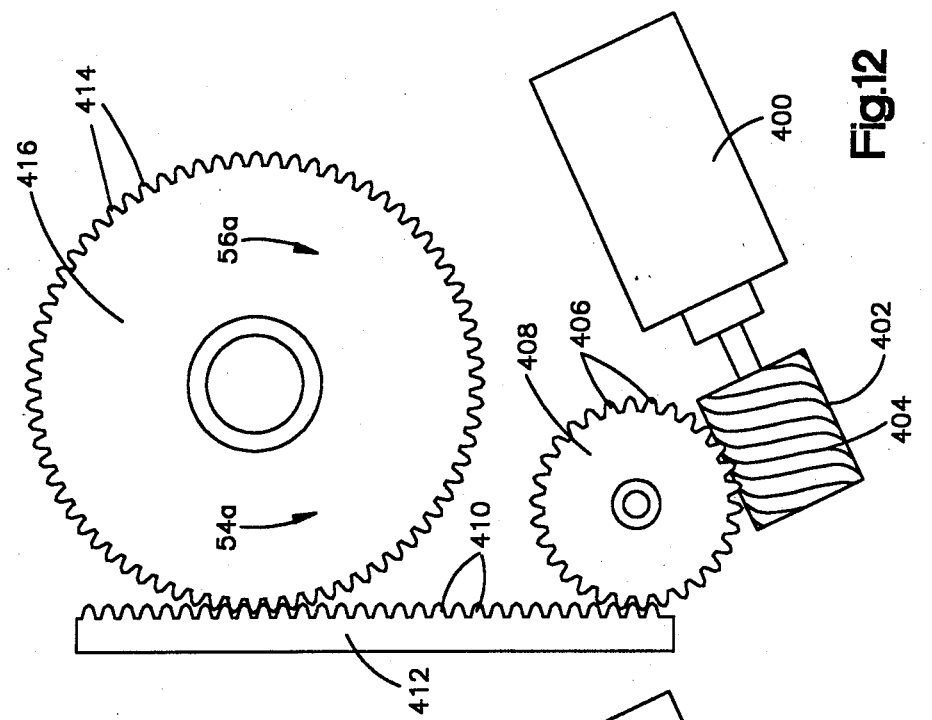
FIG. 12 is a view similar to FIG. 11 with parts in a second condition.
Figure 11:
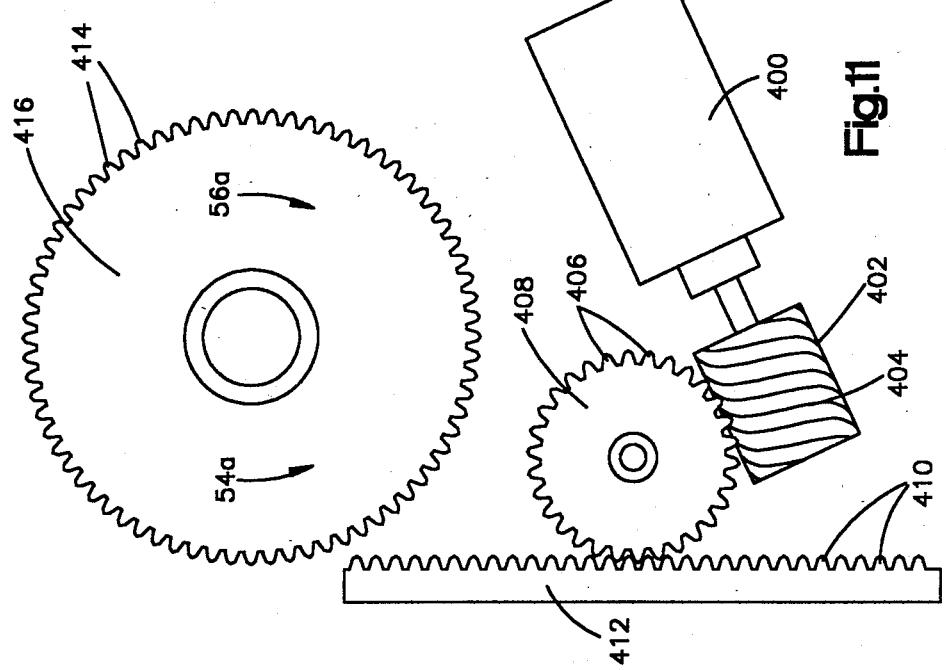
FIG. 11 is a schematic view of a retractor comfort mechanism in accordance with a third embodiment of the invention.

A comfort mechanism in accordance with a third embodiment of the invention is illustrated schematically in FIGS. 11 and 12 of the drawings. The comfort mechanism includes a DC reversible electric motor 400. The electric motor 400 drives a worm gear 402. The worm gear has gear teeth 404 which intermesh with gear teeth 406 on a worm wheel or idler gear 408. The gear teeth 406 on the idler gear 408 intermesh with gear teeth 410 on a linearly movable rack gear 412. The gear teeth 410 on the rack gear 412 are engageable with a plurality of gear teeth 414 on a rotatable disk member 416 which is rotatable in the belt retraction direction 54a and the belt withdrawal direction 56a. The rotatable disk member 416 is connected to the retractor spindle (not shown) by an auxiliary wind-up spring (not shown) in the same manner as described above with reference to the first and second embodiments of the invention, to provide the comfort mechanism with the "memory" feature described above.

To actuate the comfort mechanism shown in FIGS. 11 and 12, the vehicle occupant actuates a switch to energize the electric motor 400. The electric motor 400 rotates the worm gear 402 and the idler gear 408. The rack gear 412 is driven linearly from the condition shown in FIG. 11 to the condition shown in FIG. 12. The teeth 410 on the rack gear 412 engage the gear teeth 414 on the rotatable disk member 416, and the disk member 416 is rotated in the belt withdrawal direction 56a. The retractor spindle is thereby rotated also in the belt withdrawal direction 56a. The electric motor 400 remains energized for a predetermined period of time. The period of time is long enough so that the retractor spindle is rotated by an amount sufficient to pay out a predetermined amount of slack in the belt webbing. Preferably, the spindle is rotated enough to pay out one-half inch to one inch of belt webbing.

The gear teeth 404 on the worm gear 402 are profiled as described in co-pending U.S. patent application Ser. No. 282,744, filed Dec. 9, 1988 and assigned to the assignee of the present application, so that the idler gear 408 cannot drive the worm gear 402. The meshing engagement of the worm gear 402 and the worm wheel or idler gear 408 prevents the worm wheel 408 from rotating. This occurs because of the helix angle of the worm gear 402 and the pressure angle of the worm gear 402 engaging with the worm wheel 408. The helix angle of the worm gear 402 is less than five degrees. The pressure angle of the worm gear 402 engaging with the worm wheel 408 is greater than fifteen degrees. Accordingly, when the electric motor 400 is de-energized, the idler gear 408 cannot rotate in the counterclockwise direction as viewed in FIG. 12. Thus, the rack gear 412 cannot move linearly downwardly as viewed in FIG. 12, and the disk member 416 is blocked from rotation in the belt retraction direction 54a by the wind-up spring 62a. The retractor spindle is thus also blocked from rotation by the wind-up spring 62a in the belt retraction direction 54a. The electric motor 400, when de-energized, also resists rotation and thereby assists in blocking rotation of the disk member 416.

To disengage the comfort mechanism of FIGS. 11 and 12, the vehicle occupant can actuate a switch, unbuckle the safety belt, open a vehicle door, or shut off the vehicle. Such action energizes the electric motor 400 in the opposite direction of rotation to turn the worm gear 402, the idler gear 408 and the rack gear 412. The disk member 416 is rotated in the belt retraction direction 54a until the rack gear 412 is disengaged from the disk member 416. The electric motor 400 is de-energized. The disk member 416 is free to rotate in the belt retraction direction 54 and the comfort mechanism is disengaged.

From the above description of a preferred embodiment of the invention, those skilled in the art will perceive improvements, changes and modifications. Such improvements, changes and modifications within the skill of the art are intended to be covered by the appended claims.

Having described a specific preferred embodiment of the invention, we claim:

1. A seat belt retractor comprising:
a spindle having belt webbing wound thereon, said spindle being supported for rotation in belt retraction and belt withdrawal directions;
means for biasing said spindle to rotate in the belt retraction direction;
a rotatable member;
actuatable means having a first condition in which said rotatable member is free to rotate and a second condition in which rotation of said rotatable member by said biasing means is blocked; and
an elongate flexible member having an end portion connected to said rotatable member and another end portion connected to said spindle, said elongate flexible member being (i) wound about a portion of said spindle to a taut condition when said actuatable means is in its first condition to cause said spindle and said rotatable member to rotate together, (ii) unwound upon rotation of said spindle in the belt withdrawal direction when said actuatable means is in its second condition to enable said spindle to rotate relative to said rotatable member, and (iii) rewound about the portion of said spindle to said taut condition to limit rotation of said spindle in the belt retraction direction after withdrawal of the belt webbing from said spindle when said actuatable means is in its second condition.

2. The seat belt retractor set forth in claim 1 wherein said elongate flexible member comprises a metal coil spring for biasing said rotatable member to an initial position relative to said spindle and for rotating said rotatable member with said spindle when said actuatable means is in its first condition.

3. The seat belt retractor set forth in claim 1 wherein said actuatable means comprises a lever supported for pivotal movement and having a portion engageable with said rotatable member.

4. The seat belt retractor set forth in claim 3 wherein said rotatable member comprises a circular disk and further including a plurality of recesses spaced about the outer periphery of said disk, each of said plurality of recesses sized to receive said portion of said lever to block rotation of said disk.

5. The seat belt retractor set forth in claim 4 further including means for preventing said portion of said lever from engaging said circular disk after actuation of said actuatable means until said spindle and said circular disk rotate in the belt withdrawal direction by a predetermined amount, said preventing means comprising:
a cam supported for rotation and having a surface rotatable between a first position engaging said portion of said lever to prevent said portion of said lever from engaging said disk and a second position permitting said portion of said lever to engage said disk; and
drive means for rotating said surface of said cam between its first and second positions in response to rotation of said disk.

6. The seat belt retractor set forth in claim 1 wherein said rotatable member comprises a disk member having a plurality of recesses spaced about its periphery, said actuatable means including a pivotable and movable pawl and drive means for moving said pawl from a first position to a second position and cam means for pivoting said pawl into engagement with said disk member upon movement of said pawl from said first position to said second position to block rotation of said rotatable member by said biasing means.

7. The seat belt retractor as set forth in claim 6 wherein said drive means includes means for moving said pawl from said second position to a third position while said pawl is in engagement with said disk member to rotate said ratchet wheel and thereby said spindle in the belt withdrawal direction by a predetermined amount.

8. The seat belt retractor set forth in claim 7 wherein said drive means includes an electric motor.

9. The seat belt retractor set forth in claim 1 wherein said rotatable member comprises a disk member having a plurality of gear teeth thereon, said actuatable means comprising a first gear engageable with said gear teeth on said disk member to rotate said rotatable member in the belt withdrawal direction by a predetermined amount.

10. The seat belt retractor set forth in claim 9, wherein said actuatable means further comprises drive means for driving said first gear into engagement with said disk member, said drive means including an electric motor.

11. The seat belt retractor set forth in claim 10, including gear means intermediate said electric motor and said first gear for driving said first gear and said spindle in a belt withdrawal direction and for blocking said first gear and thereby said spindle from rotation in the belt retraction direction by said biasing means.

12. The seat belt retractor set forth in claim 11, wherein said electric motor is energized when said actuatable means is in said first condition to drive said rack gear into engagement with said disk member to rotate said disk member and said spindle in the belt withdrawal direction by a predetermined amount, and said electric motor is de-energized when said disk member and said spindle have been rotated in the belt withdrawal direction by said predetermined amount to thereby establish said second condition wherein said gear means blocks rotation of said rotatable member and thereby said spindle in the the belt retraction direction.

13. A seat belt retractor comprising:
a spindle having belt webbing wound thereon, said spindle being supported for rotation in belt retraction and belt withdrawal directions;
means for biasing said spindle to rotate in the belt retraction direction;
actuatable means for limiting rotation of said spindle in the belt retraction direction by said biasing means while permitting rotation of said spindle in the belt withdrawal direction, said actuatable means comprising:
a disk rotatable relative to said spindle;
an elongate flexible member having one end attached to said disk and another end attached to said spindle and wound about a portion of said spindle to a taut condition; and
means for fixing said disk against rotation by said biasing means, said elongate member unwinding from said taut condition in response to rotation of said spindle in the belt withdrawal direction relative to said disk when said disk is fixed against rotation and thereafter said elongate member rewinding to said taut condition when said spindle rotates in the belt retraction direction when said disk is fixed against rotation to limit rotation of said spindle in the belt retraction direction.

14. The seat belt retractor set forth in claim 13 wherein said elongate flexible member comprises a metal coil spring for biasing said disk to an initial position relative to said spindle and for rotating said disk with said spindle when said disk is free to rotate.

15. The seat belt retractor set forth in claim 13 wherein said fixing means includes a lever supported for pivotal movement and having a portion engageable with said disk for fixing said disk against rotation.

16. The seat belt retractor set forth in claim 15 wherein said disk has a plurality of recesses spaced about its outer periphery, each of said plurality of recesses sized to receive a portion of said lever for blocking rotation of said disk.

17. The seat belt retractor set forth in claim 16 further including means for preventing said portion of said lever from engaging said disk after actuation of said actuatable means until said spindle and said disk rotate in the belt withdrawal direction a predetermined amount, said preventing means comprising:

- a cam supported for rotation and having a surface rotatable between a first position engaging said portion of said lever to prevent said portion of said lever from engaging said disk and a second position permitting said portion of said lever to engage said disk; and
- drive means for rotating said surface of said cam between its first and second positions in response to rotation of said disk.

* * * * *

UNITED STATES PATENT AND TRADEMARK OFFICE
CERTIFICATE OF CORRECTION

PATENT NO. : 4,907,757

DATED : March 13, 1990

INVENTOR(S) : Robert J. Rumpf, Lawrence M. Refior, Lenard D. Klebba and Steven G. Corrion It is certified that error appears in the above-identified patent and that said Letters Patent is hereby corrected as shown below:

Column 10, Line 41, Claim 12, change "in the the belt" to --in the belt--

Signed and Sealed this

Ninth Day of April, 1991

*Attest:*

*Attesting Officer*

HARRY F. MANBECK, JR.

*Commissioner of Patents and Trademarks*